Oct. 13, 1964    M. AVRAMITO ET AL    3,152,964
FUEL CARTRIDGES FOR NUCLEAR REACTORS
Filed June 3, 1959    3 Sheets-Sheet 2
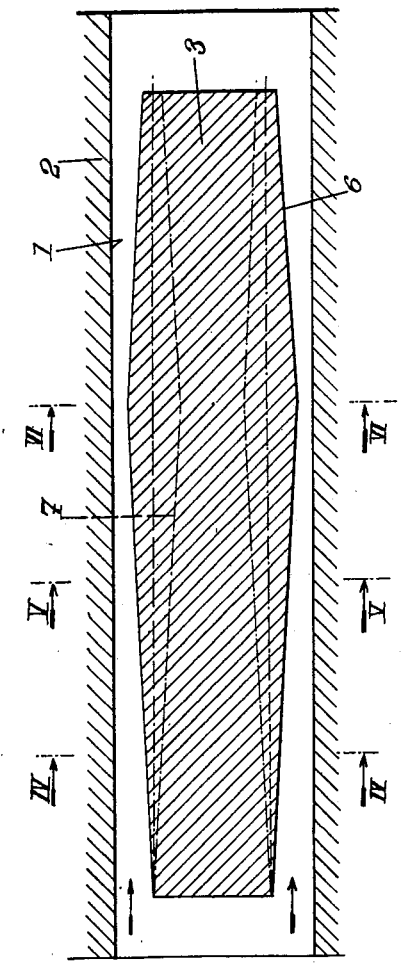
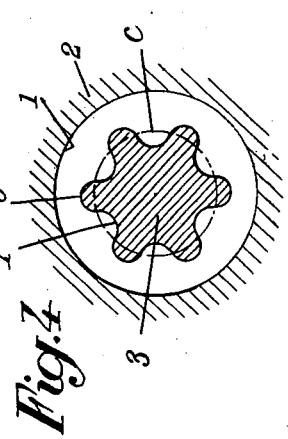
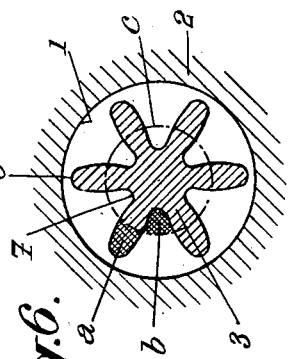
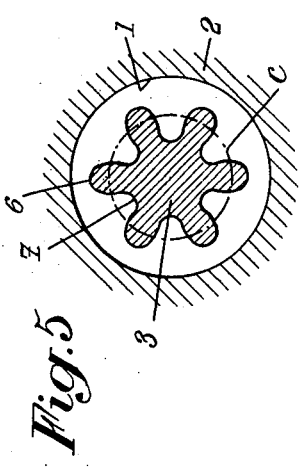

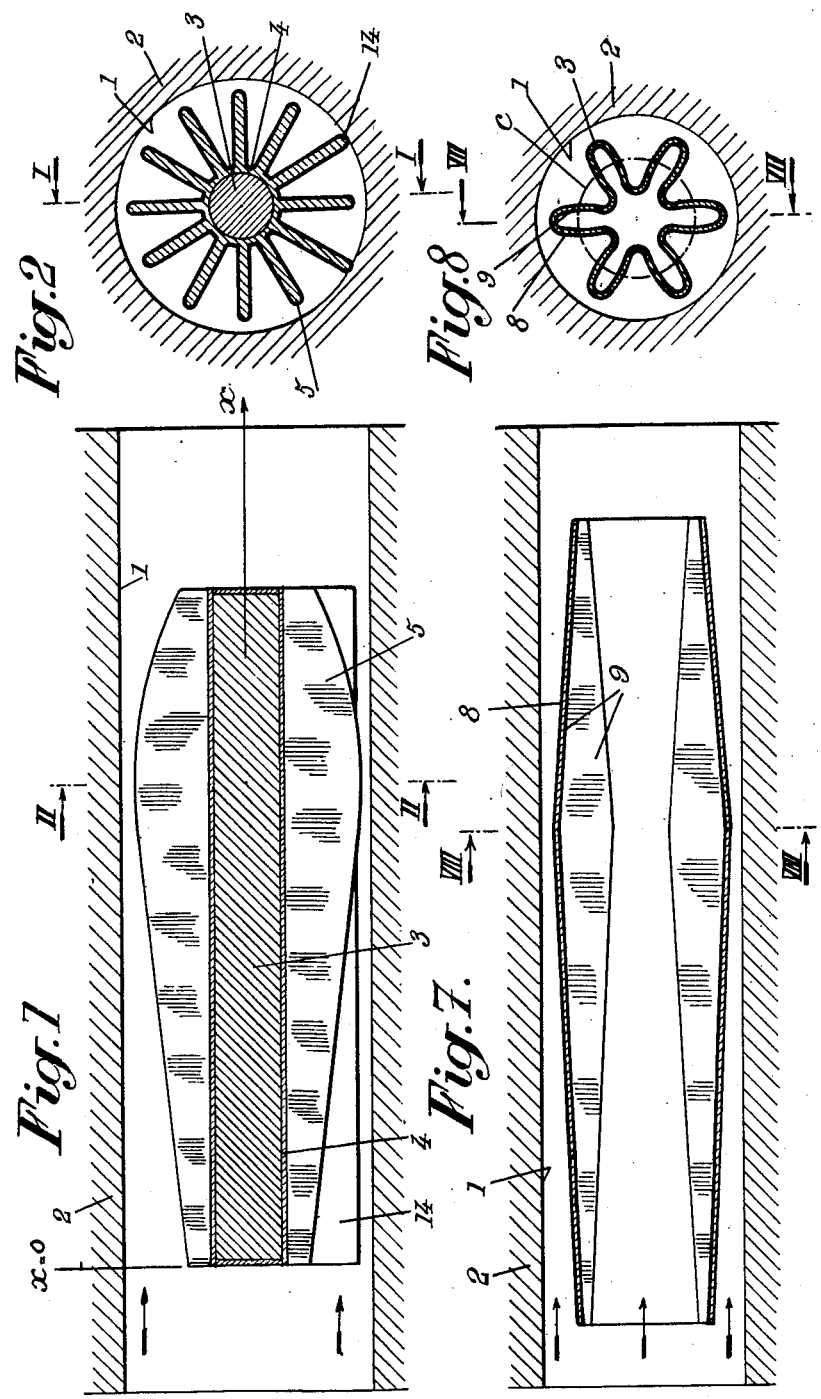

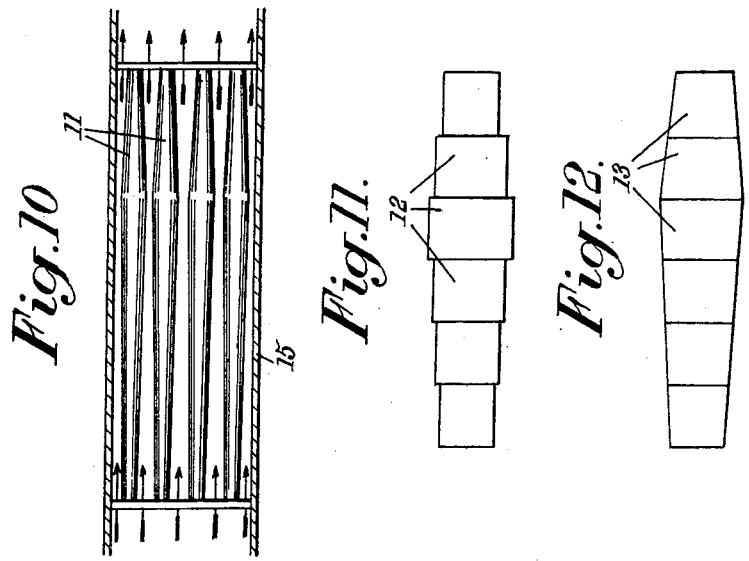
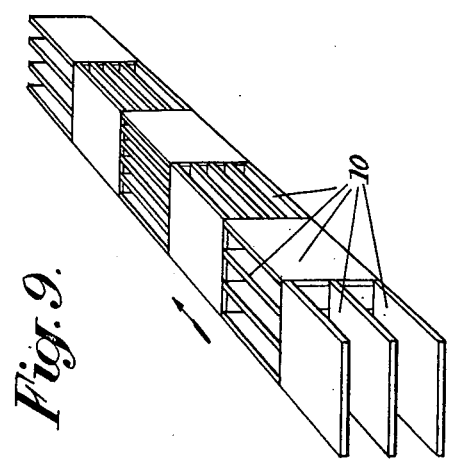

3,152,964
FUEL CARTRIDGES FOR NUCLEAR REACTORS
Maurice Avramito and René Cébélieu, Paris, France, assignors to Commissariat a l'Energie Atomique, Paris, France, an organization of France
Filed June 3, 1959, Ser. No. 817,760
Claims priority, application France June 5, 1958
2 Claims. (Cl. 176—81)

The present invention relates to fuel cartridges for nuclear reactors, such cartridges being essentially constituted by a can, either simple or multiple, containing the fissionable material, such a can being intended to be placed in a channel of a nuclear reactor through which flows a coolant fluid so as to permit evacuation of the heat produced by said fuel. The present invention is especially concerned with cartridges intended for use in reactors where all the fuel present in a channel is inserted or removed at the same time.

Its application is especially advantageous in cases where the increase of temperature in the reactor is limited due to the behaviour of the cans at high temperatures.

Its chief object is to improve the utilization of the thermal exchange surface of the cans.

It is essentially characterized in that the perimeter of the cross-section of the can of at least one cartridge varies according to the location of said cross-section along the length of said can so that the temperature of said can remains, at any point thereof, close to the maximum admissible temperature, during the operation of the reactor.

It should be reminded that, in nuclear reactors cooled by circulation of a fluid, the evacuation of the heat created by the cartridges requires large exchange areas because the convection coefficient between the fluid and the wall of the cans is relatively low.

It follows that the mass constituted by the cans of the fuel cartridges is considerable and constitutes an important portion of the mass capable of absorbing neutrons on the inside of the reactor. Such a drawback is particularly serious in the case of a high temperature reactor because, in view of the fact that the choice of the materials capable of being used is very limited, the cans generally have a high absorbing effect.

This is why these exchange surfaces should be used in the best possible conditions.

Now, in the usual case, as the profile of the can and that of the channel do not vary along the length of said channel, the temperature of the can varies along the length thereof and the coefficient of thermal exchange between said can and the coolant fluid cannot be the best possible one at all points.

In order to give the temperature at every point of the can a value close to the maximum admissible one, it has already been suggested to vary the cross-section area of the channel surrounding the can along the length of this channel, but such an arrangement involves very delicate problems concerning in particular the construction of the moderator block.

In order to obviate these drawbacks according to the present invention, the perimeter of the cross-section of the can, that is to say the thermal exchange area, is varied along the length of the can.

It is known that the heat flux supplied by a fuel can at any point thereof can be expressed, as a function of the abscissa $x$ of this point along the channel, by a sinusoidal law $f(x)$ which depends only upon the neutronic operation.

In a cross-section of abscissa $x$, it may be written that the rise $dT/dx$ of the temperature T of the coolant fluid is bound to the energy supplied by the fuel by the relation:

(1) $$\frac{dT}{dx} = \frac{1}{C_p Q} \cdot \frac{df(x)}{dx}$$

in which $C_p$ designates the specific heat at constant pressure of the coolant fluid and Q the flow rate of the fluid. From this derives the following relation:

(2) $$T(x) = T_e + \frac{f(x)}{C_p Q}$$

in which $T_e$ designates the temperature of the fluid at the inlet of the channel.

By application of the convection laws, it may also be written that:

(3) $$\frac{dT}{dx} = K \frac{p}{s} (T_g - T)$$

in which $p$ designates the thermal exchange perimeter of the section that is considered, $s$ the cross-sectional area for the flow of the fluid, $T_g$ the temperature of the can and K the Margoulis number, sometimes called "Stanton number" (number equal to the ratio $\alpha s / C_p Q$ in which $\alpha$ is the convection coefficient).

From these relations can be deduced the following one:

(4) $$p(x) = \frac{s}{K} \cdot \frac{df}{dx} \cdot \frac{1}{C_p Q (T_g - T_e) - f(x)}$$

In the general case of reactors such as made up to this time, the exchange or transfer perimeter $p$ is constant along the length of the channel, and the temperature of the can $T_g$ is variable.

In the present case, the temperature of the can $T_g$ is kept constant and equal to the maximum admissible value, and the exchange or transfer perimeter $p$ varies along the length of the channel according to the law corresponding to Relation 4.

The cross-sectional area $s$ may be variable together with the perimeter $p$ but, in a preferred form of the present invention, the cross-sectional area $s$ is kept constant and only the exchange or transfer perimeter is varied.

In this last case, it is easy to determine by calculation the total thermal exchange or transfer area E of a channel. If the temperature of the outflowing gas is designated by $T_s$, we have the following relation:

(5) $$E = \frac{s}{K} \log \left( \frac{T_g - T_e}{T_g - T_s} \right)$$

This relation shows that the total exchange or transfer area E depends only upon the form of the heat flux $f(x)$. It is possible to calculate the advantage due to the invention by comparing this area E to the total exchange area $E_0$ which would be necessary, with a conventional arrangement corresponding to a constant profile of the can, to obtain the same temperature of the outflowing gas, with the same inlet temperature $T_e$ and the same maximum temperature of the can $T_g$.

This comparison may be made either by supposing that the cross-sectional areas $s$ for the passage of the coolant are equal, or that the pressure drops are equal.

But in both cases calculation shows that the ratio $E/E_0$ depends upon the following parameter:

$$A = \frac{T_g - T_s}{T_s - T_e}$$

and that it decreases when A decreases. Consequently, it is all the more important to reduce the exchange area E as the temperature of the outflowing fluid $T_s$ is nearer to the maximum admissible temperature of the can $T_g$, or that the heating ($T_s - T_e$) of the fluid in the channel is higher.

It will thus be seen that it is particularly interesting to apply the invention to nuclear reactors working at high temperature.

Calculation shows that, for a given value $s$ of the cross-sectional area for the flow of the coolant, the arrangement according to this invention permits, as compared with the conventional arrangements, a reduction of the exchange surface and of the pressure drops averaging 40%. For a given pressure drop, the reduction of the exchange surface averages 50% and the reduction of the cross-section about 20%.

The invention therefore permits a very interesting economy of fissionable material, of energy necessary for circulating the coolant gas, and therefore of working cost of the reactor.

The invention seems particularly advantageous when every cartridge is constituted by a multiplicity of elementary cartridges juxtaposed in parallel relation to one another and/or in series arrangement so as to form lines of elements juxtaposed to one another.

Preferred embodiments of the present invention will be hereinafter described with reference to the accompanying drawings given merely by way of example and in which:

FIG. 1 shows, in longitudinal section on the line I—I of FIG. 2, a cartridge with radial fins made according to the invention.

FIG. 2 is a cross-section on the line II—II of FIG. 1.

FIG. 3 is a longitudinal sectional view of a cartridge made according to another embodiment of the invention.

FIG. 4 is a cross-section on the line IV—IV of FIG. 3.
FIG. 5 is a cross-section on the line V—V of FIG. 3.
FIG. 6 is a cross-section on the line VI—VI of FIG. 3.

FIG. 7 is a longitudinal section on the line VII—VII of FIG. 8 of a hollow cartridge made according to another embodiment of the invention.

FIG. 8 is a cross-section on the line VIII—VIII of FIG. 7.

FIG. 9 is a perspective view of a cartridge constituted by a multiplicity of flat boxes.

FIG. 10 is a diagrammatic elevational view of a multiple can cartridge.

FIG. 11 shows a multiple cartridge constituted by several elements mounted in series and juxtaposed end to end.

FIG. 12 is a similar view of a modification.

Referring to FIGS. 1 and 2, reference numeral 1 designates a cylindrical channel provided in the solid moderator 2 of a nuclear reactor.

In this channel is housed a single cartridge for use in a thermal neutron reactor, this cartridge consisting of fissionable material 3 housed in a can.

This can is constituted by a metallic tube 4 provided with radial longitudinal fins 5. The height (or radial dimension) of each of these fins varies along the length of channel 1 in such manner that the value of the thermal exchange perimeter (shown in thick lines on FIG. 2) corresponds, at least approximately, to that given by the above formula (4).

As fins 5 are thin, the cross-sectional area for the flux of the coolant fluid, which circulates in the direction of the arrow, is practically constant.

FIGS. 3 to 6 also show a channel 1 provided in moderator 2, said channel containing a single cartridge, for use in a thermal or fast neutron reactor.

The can consists of a casing the outer wall of which is inscribed in a body of revolution about the axis of channel 1, said body consisting of two coaxial conic frustums having a common large base and extending therefrom in opposed directions, the conic frustum which extends in a direction opposed to that of the coolant fluid circulation being of a length greater than that of the other conic frustum and having an apex angle smaller than that of said other conic frustum.

Said wall is provided with longitudinal corrugations consisting of ribs 6 and grooves 7, the thickness of every rib being greater than twice the thickness of the wall of the can, so that it is possible to house fissionable material 3 in said ribs.

The variations of the cross-sectional perimeter as a function of abscissa $x$ comply substantially with the law expressed by the above Formula 4.

Preferably, the cross-sectional area for the flow of the coolant fluid remains constant, which permits of uniformly distributing the mass of fuel along the channel. For this purpose, it suffices to make the profile of the can such that the cross-sectional area $a$—cross-hatched on FIG. 6—located on the outside of the mean circle $c$ (of a diameter constant along the whole length of the cartridge) are substantially equal to the cross-sectional areas $b$—also cross-hatched on FIG. 6—located on the inside of said circle $c$. Grooves 7 are therefore the deeper and ribs 6 the greater as the corresponding perimeter is more important.

FIG. 3 shows that the cross-sectional area of the upstream end of the cartridge is limited by the mean circle $c$. On this figure, the bottom of a groove 7 has been shown in dot-and-dash lines.

FIGS. 7 and 8 also show a channel 1 provided in the moderator 2 of a nuclear reactor.

In this channel is placed a single hollow cartridge for use in a thermal or fast neutron reactor.

The can of this cartridge is constituted by two parallel walls 8 and 9 close to each other and corrugated in a manner similar as above described with reference to FIGS. 3 to 6, the fissionable material 3 being housed between these two walls 8 and 9.

It should be noted that, in this embodiment illustrated by FIGS. 7 and 8, the coolant fluid circulates not only between the inner wall of the channel and the outer wall of the cartridge, but also through the passage on the inside of the hollow cartridge, the cross-sectional area for the flow of the coolant fluid being then nearly equal to the cross-sectional area of the channel.

In this construction, the thickness of the fissionable material may of course be modified as a function of the abscissa so that the mass of fissionable material is uniformly distributed along the whole length of the channel.

In the cartridge illustrated by FIG. 9 and intended to be used in a thermal or fast neutron reactor, the fissionable material is contained in rectangular flat boxes 10 (which may be slightly curved in a form similar to that of tiles) disposed parallel to one another in groups, the groups being disposed end to end in the channel. In the example illustrated by FIG. 9, there are six groups of this type which are juxtaposed and which comprise successively 3, 4, 5, 6, 5, and 4 flat boxes assembled by cross-members which are not shown.

With such an arrangement, the value of the perimeter of the canning structure does not correspond exactly to that given by Formula 4, this correspondence existing only for given abscissas (the perimeter in question being then equal to the sum of the perimeters of the corresponding flat boxes of the groups). It may be supposed for instance that said abscissas, to which correspond correct values of the perimeters, are mean abscissas of the respective groups.

In order to simplify the construction, it is preferable to give alternate directions to the groups of flat boxes, as shown by the drawing, the flat boxes of every second group being for instance horizontal and those of the other groups vertical, in the case of a horizontal channel, all said flat boxes being of course parallel to the direction of flow of the coolant fluid through the channel.

The thickness of the fissionable material contained in every flat box may be determined in such manner as to obtain a uniform distribution of the mass of fissionable material along the whole length of the channel.

FIG. 10 diagrammatically shows a can constituted by a plurality of elementary cartridges 11 parallel to one another, each being of greater cross-sectional area at intermediate points thereof, for instance at about the two thirds of their lengths from the upstream end.

The desired shape of the elementary cans 11 may be obtained by making said cans by the combination of two conic frustums, as illustrated. We might also make use of longitudinal radial fins of variable radial dimensions.

FIGS. 11 and 12 diagrammatically show two sets of cartridges intended to be charged each in a single operation in the reactor (and discharged also at the same time), the elements of the cans being constituted by boxes of cylindrical shape 12 or frusto-conical shape 13, either solid or hollow, the perimeters of which vary with the positions they occupy in the channel so as to comply, at least approximately, with the above Formula 4.

According to the inclination of the channels and to the nature of the guiding means provided for the various elements, said elements may be disposed either coaxially to one another or not.

In order to support and to guide cartridges having a variable perimeter, in particular when the channels in which these cartridges are placed are horizontal, the cartridges may be provided with fins of constant radial direction such as 14 (FIGS. 1 and 2) or equivalent means capable of cooperating directly with the inner wall of the channel or with rails or guiding ribs provided therein.

In all cases, the fissionable material should be distributed uniformly along the length of the channel if it is desired to obtain results corresponding to the above calculation.

But it should be well understood that, without departing from the scope of the invention, we might combine with a variation of the thermal exchange area along the length of the cartridge any other known means for improving this exchange, for instance a modification of the distribution of the fissionable material along the length of the cartridge, a modification of the cross-sectional area of the channel along the length of the channel, a local modification of the thickness or of the thermal qualities of the can, etc.

In a likewise manner channel 1, instead of being provided in a moderator block, might be constituted by a mere casing 15, as it is the case in fast neutron reactors, said casing possibly containing several cartridges or even all the cartridges of the reactor.

It should be noted that the cross-sectional perimeter of the cartridge at any point thereof being determined as a function of its position along the axis of the channel, the whole of the cartridge must be charged in a single operation into the reactor and removed thereof also in a single operation, and not by successive axial displacements. This does not constitute a drawback since, all the points of the can being subjected to the maximum admissible temperature, the deterioration of this can is substantially the same at all of its points.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

What we claim is:

1. In a nuclear reactor having a cylindrical channel for the circulation of a coolant fluid therethrough, said channel having an inlet end and an outlet end, a fuel cartridge for use in said channel, said cartridge comprising a can of elongated shape, said can being of a length a little smaller than that of said channel, so that one end of said can is close to the inlet end of said channel and the other end of said can is closed to the outlet end of said channel, and fissionable material in said can, the outer wall of said can being inscribed in a surface of revolution located in said channel coaxially therewith, said surface consisting of the surfaces of two coaxial conic frustums having a common large base and extending therefrom in opposed directions, the conic frustum which extends from said base toward said inlet end being of a length greater than that of the other conic frustum and having an apex angle smaller than that of said other conic frustum, said wall being provided with corrugations extending in the respective directions of generatrices of said conic furstums, said corrugations being of a depth increasing from the smaller ends of said conic frustums toward their common large base.

2. A cartridge according to claim 1 in which said can has an inner wall parallel to said outer wall, said fissionable material being housed in the interval between said two walls, so that said coolant fluid flows along both of said walls.

References Cited in the file of this patent
UNITED STATES PATENTS

| | | |
|---|---|---|
| 2,276,527 | Throckmorton et al. | Mar. 17, 1942 |
| 2,782,158 | Wheeler | Feb. 19, 1957 |
| 2,790,760 | Powell | Apr. 30, 1957 |
| 2,890,158 | Ohlinger et al. | June 9, 1959 |
| 2,898,280 | Schultz | Aug. 4, 1959 |
| 2,906,683 | Quackenbush | Sept. 29, 1959 |
| 2,907,705 | Blainey | Oct. 6, 1959 |
| 2,936,273 | Untermeyer | May 10, 1960 |
| 2,948,517 | Cosner | Aug. 9, 1960 |
| 2,968,601 | Evans et al. | Jan. 17, 1961 |
| 2,998,228 | Huet | Aug. 29, 1961 |

FOREIGN PATENTS

| | | |
|---|---|---|
| 364,861 | Great Britain | Jan. 14, 1932 |

OTHER REFERENCES

LeTourneau et al.: "Experimental Investigations of Pressure Drop Through Interrupted-Plate-Type Fuel Elements" (paper presented at 1958 Annual Meeting of the American Nuclear Society, June 2–4, 1958, copy appearing in "Nuclear Science and Engineering," vol. 7, No. 5 (May 1960), pp. 458–467.

Glasstone: Principles of Nuclear Reactor Engineering, 1955, pp. 670 and 671.

Anderson: "Combustion," February 1956, page 42.

AEC Document, WAPD–PWR–PMM–491, September 12, 1956, page 102 (Belle and Jones).